(12) United States Patent
Ogasawara

(10) Patent No.: US 7,975,118 B2
(45) Date of Patent: Jul. 5, 2011

(54) STORAGE SYSTEM AND DATA REARRANGEMENT METHOD

(75) Inventor: Hirokazu Ogasawara, Odawara (JP)

(73) Assignee: Hitachi, Ltd., Tokyo (JP)

( * ) Notice: Subject to any disclaimer, the term of this patent is extended or adjusted under 35 U.S.C. 154(b) by 741 days.

(21) Appl. No.: 12/007,848

(22) Filed: Jan. 16, 2008

(65) Prior Publication Data

US 2009/0077315 A1 Mar. 19, 2009

(30) Foreign Application Priority Data

Sep. 18, 2007 (JP) ................................ 2007-241280

(51) Int. Cl.
*G06F 12/02* (2006.01)
(52) U.S. Cl. ......... 711/165; 711/114; 711/162; 707/640
(58) Field of Classification Search .................... None
See application file for complete search history.

(56) References Cited

U.S. PATENT DOCUMENTS

| | | | |
|---|---|---|---|
| 6,304,980 B1 * | 10/2001 | Beardsley et al. ................ | 714/6 |
| 2005/0091455 A1 | 4/2005 | Kano et al. | |
| 2006/0085610 A1 * | 4/2006 | Iwamura et al. ............... | 711/162 |
| 2006/0179220 A1 * | 8/2006 | Soejima et al. ................ | 711/114 |
| 2006/0277386 A1 * | 12/2006 | Eguchi ........................... | 711/170 |
| 2007/0073988 A1 * | 3/2007 | Shibayama et al. ........... | 711/165 |
| 2007/0113041 A1 * | 5/2007 | Sakashita et al. ............. | 711/170 |
| 2007/0118715 A1 * | 5/2007 | Kusama et al. ................ | 711/170 |

FOREIGN PATENT DOCUMENTS

JP 2003-015915 7/2001

* cited by examiner

*Primary Examiner* — Kaushikkumar Patel
(74) *Attorney, Agent, or Firm* — Volpe and Koenig, P.C.

(57) ABSTRACT

The first storage apparatus includes a transmission unit for sending to a host computer, if data rearrangement in a volume is executed, a data transmission switching request for switching the transmission destination of write data, and a rearrangement unit for rearranging data in the volume. The host computer includes a data transmission switching unit for switching, after receiving the data transmission switching request from the transmission unit, the transmission destination of the write data from a first virtual volume in the first storage apparatus to a second virtual volume in a second storage apparatus. The rearrangement unit rearranges data in the first volume after the data transmission switching unit switches the transmission destination of the write data from the first virtual volume in the first storage apparatus to the second virtual volume in the second storage apparatus.

6 Claims, 13 Drawing Sheets

Storage Apparatus ID: 00100A (71A)

| POOL VOLUME ID | RAID LEVEL | DRIVE TYPE | NUMBER OF DRIVE ROTATIONS | USED CAPACITY | USAGE STATUS |
|---|---|---|---|---|---|
| LU001 | 3D+1P | HDDxxxx | 15000rpm | 100GB | NORMAL |
| LU002 | 7D+1P | HDDxxxx | 10000rpm | 50GB | NORMAL |
| LU003 | 2D+2P | HDDxxxx | 7200rpm | 300GB | BLOCKED |
| ⋮ | ⋮ | ⋮ | ⋮ | ⋮ | ⋮ |

Storage Apparatus ID: 00100A (81A)

| DIFFERENCE DATA ID | UPDATE TIME | DATA SIZE | START LBA | LAST LBA |
|---|---|---|---|---|
| 001 | 8:11:36:38 | 32.1414 | 784A5D | 864AAE |
| 002 | 8:11:36:40 | 42.8294 | 462BEE | 464998 |
| 003 | 8:11:36:45 | 124.5392 | AA45 | ABB1 |
| ⋮ | ⋮ | ⋮ | ⋮ | ⋮ |

| STORAGE APPARATUS ID | 00100A | | |
|---|---|---|---|
| CONNECTED STORAGE APPARATUS ID | I/O ACCESS | | PERFORMANCE VALUE |
| 00100A | ON | | 38392 |
| 00100B | OFF | | 124929 |
| 00100C | OFF | | 85639 |
| ⋮ | ⋮ | | ⋮ |

STORAGE SYSTEM AND DATA REARRANGEMENT METHOD

CROSS-REFERENCES TO RELATED APPLICATIONS

This application relates to and claims priority from Japanese Patent Application No. 2007-241280, filed on Sep. 18, 2007, the entire disclosure of which is incorporated herein by reference.

BACKGROUND

The invention relates generally to a storage system and a data rearrangement method suitable for use in, for example, a storage system where data is backed up between storage systems.

A method managing plural hard disks utilizing RAID (Redundant Array of Independent/inexpensive Disks) format is conventionally used in storage systems that store data using storage apparatuses. At least one logical volume is formed in a physical storage area provided by a number of hard disks.

Recently, a "dynamic storage area allocation" technique, i.e., a technique of not creating a logical volume with a fixed capacity using a storage area in hard disks, but providing a host computer with a virtual volume using plural logical volumes and dynamically allocating a storage area in the logical volumes to the virtual volume in response to a request from a host computer has been proposed (for example, see Japanese Patent Laid-Open Publication No. 2003-015915).

However, if a new storage area in a logical volume is added to a virtual volume using the "dynamic storage area allocation" technique, the amount of data stored may vary depending on the logical volumes used for the virtual volume, and, as a result, access will possibly concentrate in some specific logical volumes and the performance when responding to requests from a host computer may deteriorate as a whole.

In that regard, for example, a data rearrangement technique for improving the performance when responding to requests from a host computer by averaging the data amounts stored in logical volumes used by a virtual volume and rearranging data stored in those logical volumes has been proposed. However, when implementing that data rearrangement technique, the data rearrangement is executed after temporarily stopping the host computer from sending requests. Accordingly, requests from the host computer cannot be received during the data rearrangement process, and the response performance deteriorates.

SUMMARY

The present invention has been made in light of the circumstances described above, and its object is to provide a storage system and a data rearrangement method that can improve the entire system performance.

To achieve the above object, in an aspect of the invention, a storage system includes: a host computer for sending various kinds of requests and write data; a first storage apparatus having a first virtual volume that can be dynamically extended and that is provided to the host computer, and a first volume allocated to the first virtual volume, the first volume being a volume where data sent from the host computer is written; and a second storage apparatus having a second virtual volume for backing up data stored in the first virtual volume, and a second volume allocated to the second virtual volume, the second volume being a volume where data sent from the first storage apparatus is written. In that storage system, the first storage apparatus further includes: a first transmission unit for sending to the host computer, if data rearrangement in the first volume is executed, a data transmission switching request for switching the transmission destination of the write data; and a first rearrangement unit for rearranging data in the first volume. The host computer includes a data transmission switching unit for switching, after receiving the data transmission switching request sent from the first transmission unit, the data transmission destination so that write data, which was originally directed to the first virtual volume in the first storage apparatus, is sent to the second virtual volume in the second storage apparatus. The first rearrangement unit rearranges data in the first volume after the data transmission switching unit switches the transmission destination of the write data from the first virtual volume in the first storage apparatus to the second virtual volume in the second storage apparatus.

With that configuration, the storage system the host computer sends data to is different from the storage system in which data rearrangement is executed. Accordingly, the data rearrangement does not affect the write data transmission from the host computer, and can be executed without temporarily stopping the host computer sending data. By doing so, the situation where data sent from the host computer cannot be received during the data rearrangement and the response performance deteriorates can be effectively prevented.

In another aspect of the invention, a data rearrangement method for a storage system includes: a host computer for sending various kinds of requests and write data; a first storage apparatus having a first virtual volume that can be dynamically extended and that is provided to the host computer, and a first volume allocated to the first virtual volume, the first volume being a volume where data sent from the host computer is written; and a second storage apparatus having a second virtual volume for backing up data stored in the first virtual volume, and a second volume allocated to the second virtual volume, the second volume being a volume where data sent from the first storage apparatus is written, the data rearrangement method including: a first step of sending, to the host computer, a data transmission switching request for switching a transmission destination of the write data if the data rearrangement in the first volume is executed; a second step of switching, after the host computer receives the data transmission switching request sent in the first step, the transmission destination of the write data from the first virtual volume in the first storage apparatus to the second virtual volume in the second storage apparatus; and a third step of rearranging data in the first volume after, in the second step, the transmission destination of the write data is switched from the first virtual volume in the first storage apparatus to the second virtual volume in the second storage apparatus.

With that configuration, the storage system the host computer sends data to is different from the storage system in which data rearrangement is executed. Accordingly, the data rearrangement does not affect the write data transmission from the host computer, and can be executed without temporarily stopping the host computer sending data. By doing so, the situation where data sent from the host computer cannot be received during the data rearrangement and the response performance deteriorates can be effectively prevented.

With the above described invention, a storage system and a data rearrangement method capable of improving the entire system performance can be achieved.

Other aspects and advantages of the invention will be apparent from the following description and the appended claims.

BRIEF DESCRIPTION OF THE DRAWINGS

FIG. 5 is a conceptual diagram illustrating a configuration for a volume information management table.

FIG. 6 is a conceptual diagram illustrating a configuration for a difference management table.

FIG. 7 is a conceptual diagram illustrating a configuration for a host I/O management table.

DETAILED DESCRIPTION OF PREFERRED EMBODIMENTS

An embodiment of the invention will be described below with reference to the drawings.

1. Hardware Configuration for Storage System 1 in this Embodiment

Figure 1:
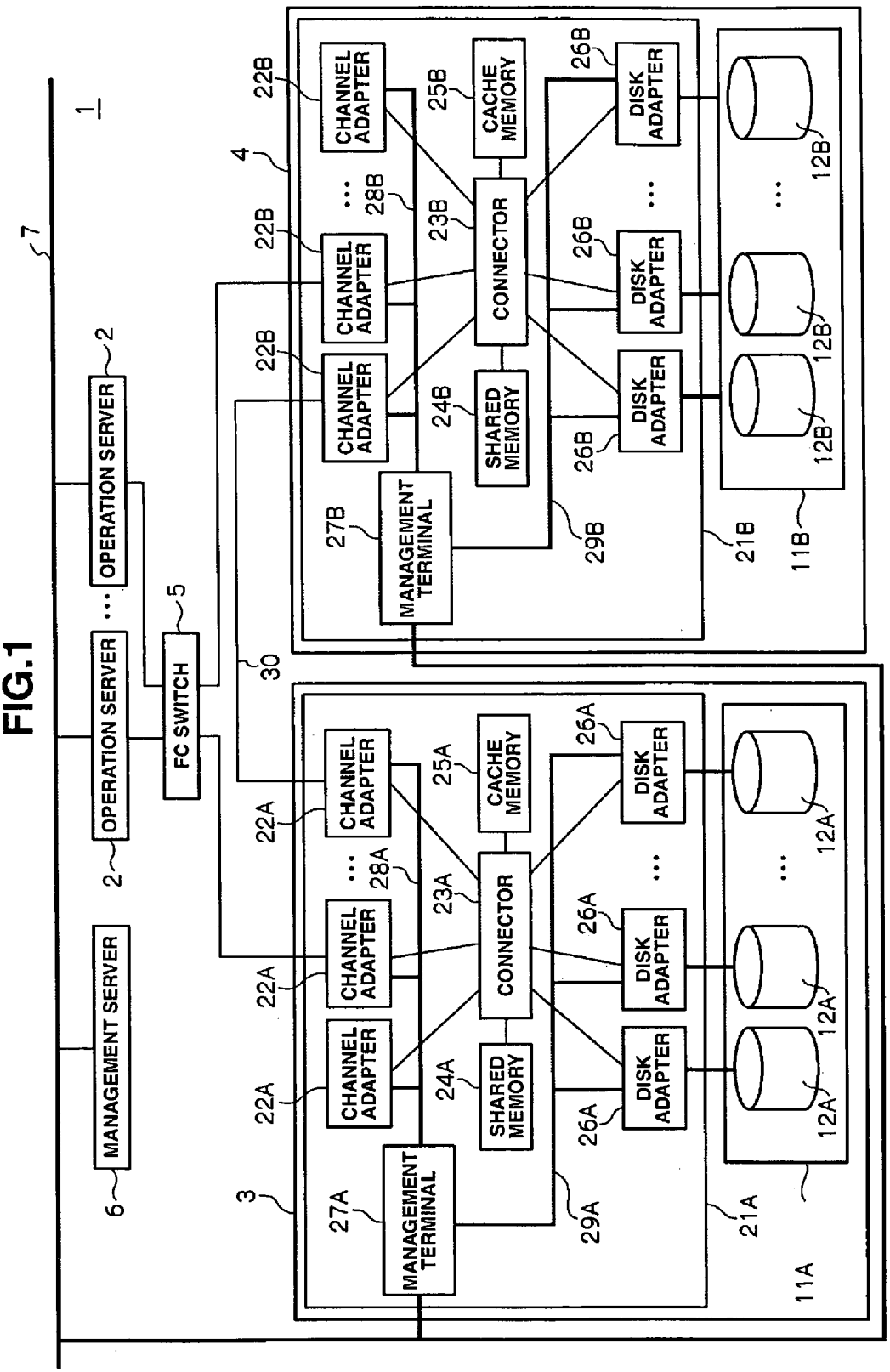
FIG. 1 is a block diagram showing a schematic hardware configuration for a storage system in an embodiment of the invention.

FIG. 1 shows a hardware configuration for a storage system 1 in this embodiment. The storage system 1 includes an operation server(s) (host computer(s)) 2, a first storage apparatus 3, and a second storage apparatus 4, mutually connected via an FC (Fibre Channel) switch 5. In the storage system 1, the operation server 2, the first storage apparatus 3, and the second storage apparatus 4 are connected to a management server 6 via a network 7 such as a LAN (Local Area Network).

The operation server 2 is a computer device having information processing resources (not shown) such as a CPU (Central Processing Unit) and memory, and examples of such a computer device include a personal computer, a workstation, and a mainframe. The operation server 2 also has a Fibre Channel host bus adapter (FC HBA) (not shown) for connecting the FC switch 5, information input devices (not shown) such as a keyboard, a switch, a pointing device, and a microphone, and information output devices (not shown) such as a monitor display and a speaker.

The FC switch 5 exchanges commands and data with the operation server 2 via the Fibre Channel host bus adapter in units of blocks, which are data management units for storage resources provided by the operation server 2. In this storage system 1, the protocol used in the communication between the operation server 2, the first storage apparatus 3, and the second storage apparatus 4 is Fibre Channel protocol.

The operating server 2 and the first and second storage apparatuses 3 and 4 do not necessarily have to be connected via a SAN (Storage Area Network) using the FC switch 5, and may alternatively be connected via LAN or similar. For example, in the case of connection via a LAN, commands and data are exchanged in accordance with TCP/IP (Transmission Control Protocol/Internet Protocol). When using a LAN, a LAN-compliant network card or similar may be used, instead of the host bus adapter 3. In this invention, the operation server 2 may be directly connected to the first and second storage apparatuses 3 and 4, not via the FC switch 5.

The first storage apparatus 3 includes a storage device unit 11A including plural disk devices 12A for storing data, and a control unit 21A for controlling data I/O to/from the storage device unit 11A.

Examples of the disk devices 12A in the storage device unit 11A include an expensive disk such as an SCSI (Small Computer System Interface) disk, or an inexpensive disks such as an SATA (Serial AT Attachment) disk or an optical disk.

The disk devices 12A in the storage device unit 11A are operated in RAID format by the control unit 12A. One or several logical volumes are set in a physical storage area provided by one or several disk devices 12A. Data is stored in the logical volumes in units of blocks of a predetermined size (hereinafter referred to as a "logical block").

Each logical volume is provided with a specific identifier (hereinafter referred to as an "LU (Logical Unit Number)"). In this embodiment, data is input/output by specifying an address, which is a combination of the LU and a specific number given to each logical block (LBA: Logical Block Address).

The control unit 21 includes plural channel adapters 22A, a connector 23A, shared memory 24A, cache memory 25A, plural disk adapters 26A, and a management terminal 27A.

Each channel adapter 22 is configured as a microcomputer including a microprocessor, memory, and a communication interface and the like, and has a port for connecting the FC switch 5 and the second storage apparatus 4. The channel adapter 22 interprets various commands sent from the operation server 2 via the FC switch 5 and executes relevant processing. A network address (for example, an IP address or WWN) is allocated to a port in each channel adapter 22A to identify each of the ports. That network address enables each channel adapter 22 to act individually as NAS (Network Attached Storage).

The connector 23A is connected to the channel adapters 22A, the shared memory 24A, the cache memory 25, and the disk adapters 26A. Data and commands are exchanged, via the connector 23A, between the channel adapters 22A, shared memory 24A, cache memory 25A, and disk adapters 26A. The connector 23A is a bus or a switch such as a super high-speed cross bus switch that transmits data via high-speed switching.

The shared memory 24A and the cache memory 25A are storage memory shared by the channel adapters 22A and the disk adapters 26A. The shared memory 24A is used mainly to store commands and system configuration information about the entire configuration of the first storage apparatus 3. Various programs and tables stored in the shared memory 24A will be described later.

The cache memory 25A is used mainly to temporarily store data input/output to/from the first storage apparatus 3.

Each disk adapter 26A is configured as a microcomputer system having microprocessor and memory, or similar, and functions as an interface that controls the protocol during communication with the disk devices 12A in the storage device unit 11A. A disk adapter 26A is connected via, for example, a Fibre Channel cable, with a corresponding disk device 12A in the storage device unit 11A, and exchanges data with that disk device 12A in accordance with FC protocol.

The management terminal 27A is a terminal device for controlling the entire operation of the first storage apparatus 3, and examples of the management terminal 27A include a notebook personal computer. The management terminal 27A is connected to each channel adapter 22A via the LAN 28A, and each disk adapter 26A via the LAN 29A. The management terminal 27A, for example, monitors the first storage apparatus 3 for the occurrence of failures. If a failure occurs, the management terminal 27 indicates the failure occurrence on its own display, and executes processing for blocking the relevant disk device 12A in the storage device unit 11A in accordance with operation by an operator. An operator can define the system configuration information using the management terminal 27A, and store the thus-defined system configuration information in the shared memory 24A via the channel adapters 22A or the disk adapters 26A and the connector 23A.

The second storage apparatus 4 has the same configuration as the first storage apparatus 3. In FIG. 1, the components in the second storage apparatus 4 the same as those in the first storage apparatus 3 are provided with the same reference numbers, followed by a suffix "B" instead of "A". In the second storage apparatus 4, a channel adapter 22B is connected to one of the channel adapters 22A in the first storage apparatus 3 via a signal line 30 such as a Fibre Channel cable or a LAN cable, and the required commands and data are exchanged with the first storage apparatus 3 via the signal line 30.

The management terminal 27B in the second storage apparatus 4 is connected to the management terminal 27A in the fist storage system 3 via the network 7, and the management terminal 27B in the second storage apparatus 4 can exchange, via the network 7, necessary information with the management terminal 27A in the first storage apparatus 3.

The management server 6 is a computer device having information processing resources (not shown) such as a CPU and memory, and examples of the management server 6 include a personal computer and a workstation. The management server 6 has information input devices (not shown) such as a keyboard, switch, pointing device, and a microphone, and information output devices (not shown) such as a monitor display and speaker. The management server 6 is a terminal device for controlling the entire operation in the storage system 1. For example, the management server 6 monitors the operation server 2 and the first and second storage apparatuses 3 and 4, and sends various requests to control the operation server 2 and the first and second storage apparatuses 3 and 4.

2. Software Configuration for Storage System 1 and Logical Configuration for Disk Device 12

Figure 2:
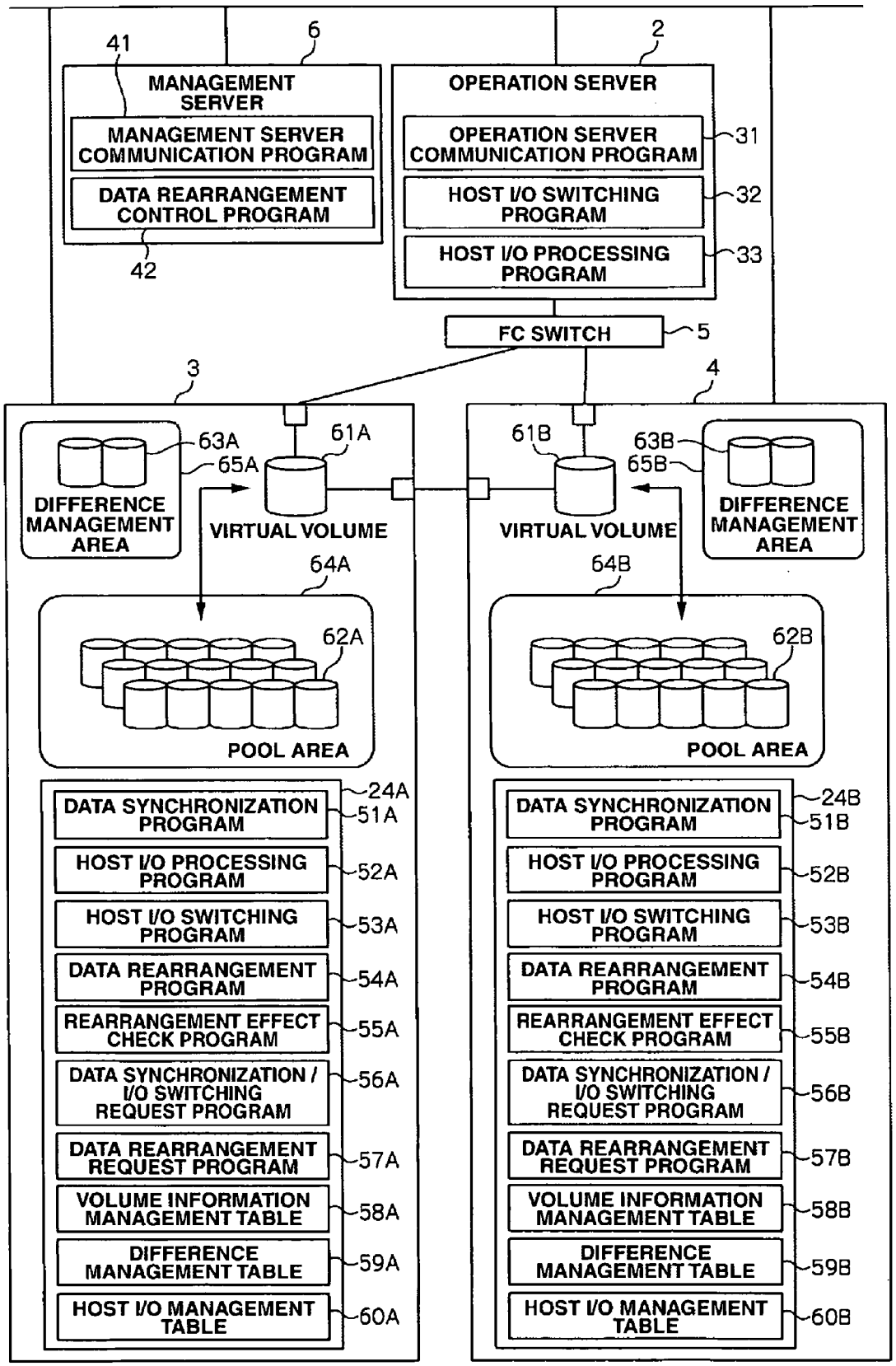
FIG. 2 is a block diagram showing a schematic software configuration for the storage system and a logical configuration for disk devices.

FIG. 2 shows a software configuration for the storage system 1 and a logical configuration for the disk devices 12.

First, the software configuration for the storage system 1 will be described.

The memory in the operation server 2 stores an operation server communication program 31 for controlling communication between the operation server 2 and other devices, a host I/O switching program 32, and a host I/O processing program 33 for controlling requests and data exchange between the first storage apparatus 3 and second storage apparatus 4. The CPU in the operation server 2 executes various kinds of processing by running those programs. The specific sequence based on the host I/O switching program 32 will be described later.

The memory in the management server 6 stores a management server communication program 41 for controlling communication between the management server 6 and other devices, and a data rearrangement control program 42. The CPU in the management server 6 executes various kinds of processing by running those programs. The specific sequences based on the data rearrangement control program 42 will be described later.

The shared memory 24A in the first storage apparatus 3 stores a data synchronization program 51A, a host I/O processing program 52A, a host I/O switching program 53A, a data rearrangement program 54A, a rearrangement effect check program 55A, a data synchronization/I/O switching request program 56A, a data rearrangement request program 57A, a volume information management table 58A, a difference management table 59A, and a host I/O management table 60A.

The disk adapters 26A in the first storage apparatus 3 execute various kinds of processing by referring to those tables and running those programs. The specific sequences based on the data synchronization program 51A, the host I/O processing program 52A, the host I/O switching program 53A, the data rearrangement program 54A, the rearrangement effect check program 55A, the data synchronization/I/O switching request program 56A, and the data rearrangement request program 57A will be described later. The specific configurations of the volume information management table 58A, the difference management table 59, and the host I/O management table 60A will also be described later.

The shared memory 24B in the second storage apparatus 4 stores the same programs and tables as those stored in the shared memory 24A in the first storage apparatus 3. In FIG. 2, the programs and tables stored in the shared memory 24B in the second storage apparatus 4 the same as those stored in the first storage apparatus 3 are provided with the same reference numbers, followed by a suffix "B," instead of "A."

Next, the logical configuration for the disk devices 12A in the first storage apparatus 3 in the storage system 1 will be described below.

In the first storage apparatus 3, the logical volumes can be broadly divided into virtual volumes 61A that are logical volumes accessed by the host computer 2, pool volumes 62A that are logical volumes set in the real volumes used for mapping to the virtual volume 60A, and difference management volumes 63A that are logical volumes set in the real volumes used to store difference data for the virtual volume 60A. In the first storage apparatus 3, a pool area 64A is formed by the plural pool volumes 62A, and a difference management area 65A is formed by the plural difference management volumes 63A.

When a pool volume 62A in the pool area 64A is allocated to the virtual volume 61A, the storage area for this pool volume 62A in the disk device 12 is dynamically allocated, and therefore provided to the virtual volume 61A.

Since the logical configuration for the disk devices 12B in the second storage apparatus 4 is the same as the logical configuration for the disk devices 12A in the first storage apparatus 3, in FIG. 2 the types of logical volume in the second storage apparatus 4 the same as those in the first storage apparatus 3 are provided with the same reference numbers, followed by a suffix "B," instead of "A."

In the storage system 1, the first storage apparatus 3 sends, when receiving data from the operation server 2, the data to the second storage apparatus 4 at a time other than that of the reception from the operation server 2, and the second storage apparatus 4, when receiving data from the operation server 2, sends the data to the first storage apparatus 3 at a time other than that of the reception from the operation server 2, mutually backing up data between the first and second storage apparatuses 3 and 4.

More specifically, the first storage apparatus 3 writes, via the channel adapters 22A, connector 23A, cache memory 25A, and disk adapters 26A, data received from the operation server 2 to the storage area in the disk device 12A for a pool volume 62A used by the virtual volume 61.

Next, the first storage apparatus 3 sends, at a time other than that of the data writing, the data written to the disk device 12A to the second storage apparatus 4 via the disk adapters 26A, the cache memory 25A, the connector 23A, the channel adapters 22A, and the signal line 30.

The second storage apparatus 4 writes, via the channel adapters 22B, the connector 23B, the cache memory 25B, and the disk adapter 26B, the data received from the first storage apparatus 3 to the storage area in the disk device 12B for the pool volume 62B used by the virtual volume 61B corresponding to the virtual volume 61A.

Meanwhile, in the same way, the second storage apparatus 4 writes data received from the operation server 2 to a storage area in the disk device 12B for a pool volume 62B used by the virtual volume 61B, and then writes, at a time other than that of the above data writing, that data to the storage area in the disk device 12A for a pool volume 62A used by the virtual volume 61A corresponding to the virtual volume 61B.

3. Summary of Data Rearrangement Processing in Storage System 1

Figure 3:
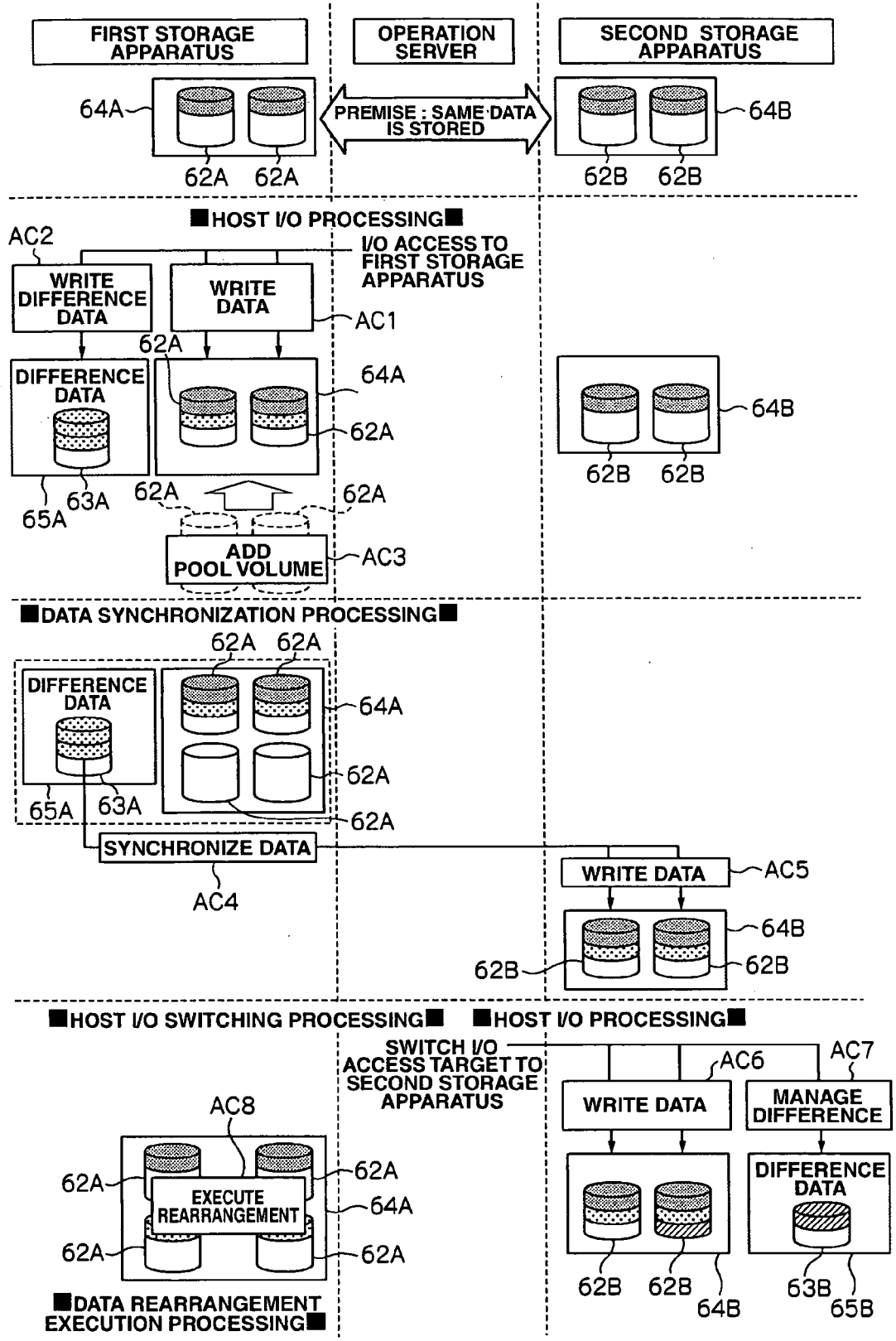
FIG. 3 is a conceptual diagram illustrating the summary of data rearrangement processing in the storage system.
Figure 4:
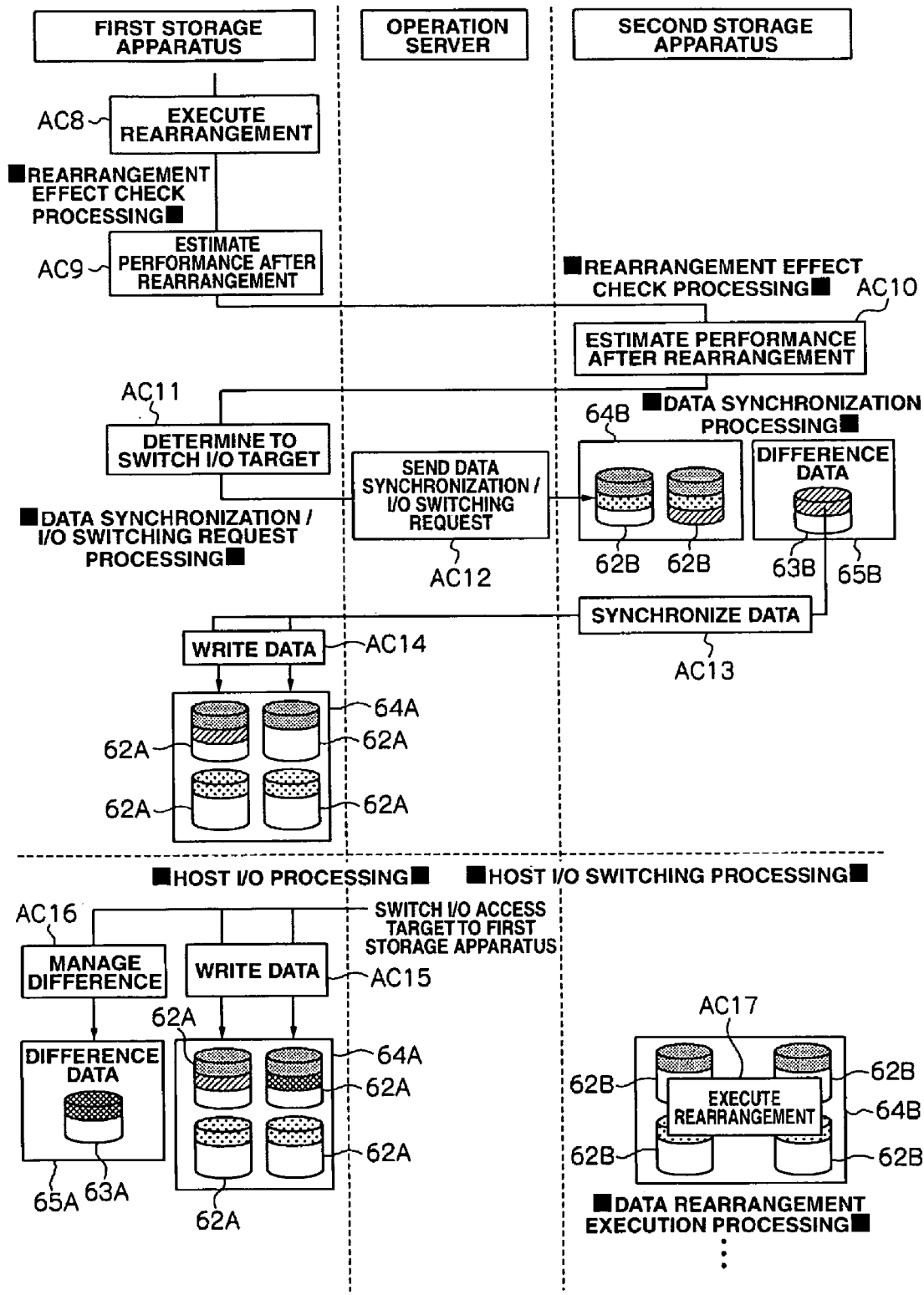
FIG. 4 is a conceptual diagram illustrating the summary of data rearrangement processing in the storage system.

FIG. 3 shows a specific example of the summary of the data rearrangement processing in the storage system 1. In this example, the same data is stored in the virtual volumes 61A and 61B. In other words, as shown in FIG. 3, it is assumed that the virtual volumes 61A and 61B use the same capacity and the same number of the pool volumes 62A and 62B, and the pool volumes 62A and 62B store the same data.

Note that the following description is merely an example, and the present invention is not based on the premise that the virtual volumes 61A and 61B use the same capacity and the same number of the pool volumes 62A and 62B and that the pool volumes 62A and 62B store the same data. The invention can be used when the first and second storage apparatuses 3 and 4 store the same data.

In this example, the operation server 2 and the first storage apparatus 3 exchange requests or data (hereinafter referred to as "I/O access") by having the operation server 2 and the first storage apparatus 3 execute the host I/O processing. In this embodiment, exchange of requests or data between the operation server 2 and the second storage apparatus 5 is also referred to as "I/O access."

The first storage apparatus 3 writes, when writing data by executing the host I/O processing, data sent from the operation server 2 to the storage area for a pool volume 62A used by the virtual volume 61A in accordance with a data write request sent from the operation server 2 (AC1), and writes difference data for the data sent from the operation server 2 to the storage area for the difference management volume 63A.

The first storage apparatus 3 adds a pool volume 62 to the pool area 64 in accordance with a request from the management terminal 27A (AC3), allocates the above added pool volume 62A to a volume used by the virtual volume 61A, and executes, when receiving a data rearrangement request from the management server 6, data synchronization processing to synchronize the data stored in the pool volume 62A used by the virtual volume 61A with the data stored in the pool volume 62B used by the virtual volume 61B (AC4).

In other words, the first storage apparatus 3 sends the difference data stored in the difference management volume 64A to the second storage apparatus 4. The second storage apparatus 4 then writes the difference data sent from the first storage apparatus 3 to the storage area for the pool volume 62B used by the virtual volume 61B corresponding to the virtual volume 61A (AC5).

After that, the first storage apparatus 3 sends a host I/O switching request to the operation server 2 by executing the host I/O switching processing. The operation server 2 switches, when receiving the host I/O switching request from the first storage apparatus 3, the I/O access target by executing the host I/O switching processing so that the operation server 2, which I/O accessed the first storage apparatus 3, instead I/O accesses the second storage apparatus 4. The operation server 2 then I/O accesses the second storage apparatus 4 by executing the host I/O processing.

When writing data by executing the host I/O processing, the second storage apparatus 4 writes, in accordance with a data write request sent from the operation server 2, the data sent from the operation server 2 to the storage area for the pool volume 62B used by the virtual volume 61B (AC6), and writes the difference data for the data sent from the operation server 2 to the operation area for the difference management volume 63B (AC7).

After that, the first storage apparatus 3 executes, after finishing the host I/O switching processing, the data rearrangement execution processing to move, for example, the difference data stored in the pool volume 62A to the above added pool volume 62A, thereby rearranging the data stored in the pool volume 62A used by the virtual volume 61A (AC8).

The first storage apparatus 3 executes, after finishing the data rearrangement execution processing, the rearrangement effect check processing to estimate its performance, i.e., calculates an I/O access performance value after the data rearrangement by, for example, I/O accessing with the operation server 2 a predetermined number of times (AC9).

After that, the first storage apparatus 3 sends a rearrangement effect check request to the second storage apparatus 4. The second storage apparatus 4 estimates, after receiving the rearrangement effect check request from the first storage apparatus 3, its performance, i.e., calculates a current I/O access performance value by, for example, I/O accessing the operation server 2 a predetermined number of times (AC10), and sends the resultant current I/O access performance value to the first storage apparatus 3.

After that, the first storage apparatus 3 compares the above calculated I/O access performance value in the first storage apparatus 3 with the I/O access performance value in the second storage apparatus 4 sent above, and determines whether or not to switch the I/O access target so that the operation server 2, which I/O accessed the second storage apparatus 4, instead I/O accesses the first storage apparatus 3 (AC11).

If the first storage apparatus 3 decides to switch the I/O access target to have the operation server 2 I/O accesses the first storage apparatus 3, the first storage apparatus 3 sends a data synchronization/I/O switching request to the second storage apparatus 4 by executing the data synchronization/I/O switching request processing (AC12). The second storage apparatus 4 executes, after receiving the data synchronization/I/O switching request from the first storage apparatus 3, the data synchronization processing to synchronize the data stored in the pool volume 62B used by the virtual volume 61B with the data stored in the pool volume 62A used by the virtual volume 61A (AC13).

In other words, the second storage apparatus 4 sends the difference data stored in the difference management volume 64B to the first storage apparatus 3. The first storage apparatus 3 writes the difference data sent from the second storage apparatus 4 to the storage area for the pool volume 62A used by the virtual volume 61A corresponding to the virtual volume 61B (AC14).

The second storage apparatus 4 then sends a host I/O switching request to the operation server 2 by executing host I/O switching processing. The operation server 2 executes, after receiving the host I/O switching request from the second storage apparatus 4, the host I/O switching processing to switch the I/O access target so that the operation server 2, which I/O accessed with the second storage apparatus 4, instead I/O accesses the first storage apparatus 3. The operation server 2 and the first storage apparatus 3 I/O accesses each other by executing the host I/O processing.

If the first storage apparatus 3 writes data by executing the host I/O processing, the first storage apparatus 3 writes, in accordance with the data write request sent from the operation server 2, the data sent from the operation server 2 to the storage area for the pool volume 62A used by the virtual volume 61A (AC15), and writes the difference data for the data sent from the operation server 2 to the storage area for the difference management volume 63A (AC16).

The second storage apparatus 4 executes, after finishing the host I/O switching processing, the data rearrangement execution processing to, for example, move the difference data stored in the pool volume 62B to another pool volume 62B and rearrange the data stored in the pool volume 62B used by the virtual volume 61B (AC17).

After step AC17, the second storage apparatus 4 is configured to execute, if necessary, the rearrangement effect check processing and the data synchronization/I/O switching request processing as those executed above in the first storage apparatus 3.

Note that the operation server 2 and the second storage apparatus 4 also I/O accesses each other, and the second storage apparatus 4 may execute the same processing as the above described processing executed by the first storage apparatus 3 too.

4. Configurations for Various Tables

FIG. 5 shows a configuration for the volume information management table 58A. The volume information management table 58A contains information necessary for calculating an I/O access performance value.

The volume information management table 58A includes: a storage apparatus ID column 71A for managing storage apparatus IDs, which uniquely specify a storage apparatus, for the storage apparatus holding this volume information management table 58A; a pool volume ID column 72A for managing pool volume IDs each uniquely specifying a pool volume 62A; a RAID level column 73A for managing the RAID level of the pool volumes 62; a drive type management column 74A for managing the drive type of the disk devices 12A used for the pool volume 62A; a number-of-drive-rotation column 75A for managing the number of drive rotations of the disk devices 12 used for the pool volume 62A; a used capacity column 76A for managing the used capacity in the pool volume 62A; and a usage status column 77A for managing the usage status of the pool volumes 62A.

For example, the pool volume 62A with the pool volume ID "LU001" stored in the volume information management table 58A for the storage apparatus ID "00100A" has a RAID level of "3D+1 P," uses the disk device 12A of drive type "HDDxxxx" with a drive rotation of "15000 rpm," the used capacity in this pool volume 62A being "100 GB," and its usage status being "normal." In the invention, the storage apparatus ID "00100A" is an ID for the first storage apparatus 3, and the storage apparatus ID "00100B," which will be mentioned later, is an ID for the second storage apparatus 4.

FIG. 6 shows a configuration for the difference management table 59A. The difference management table 59A contains information necessary for managing difference data stored in a difference management volume.

The difference management table 59 includes: a storage apparatus ID column 81A for managing the storage apparatus ID for the storage apparatus holding this difference management table 59A; a difference data ID column 82A for managing difference data IDs each uniquely specifying the difference data; an update time column 83A for managing the time when the data in the virtual volume 61A is updated and the difference data is stored in the difference management volume 63A; a data size column 84A for managing data size of the difference data; a start LBA column 85A for managing start LBAs for the stored difference data; and an last LBA column 86A for managing last LBAs for the stored difference data.

For example, the difference data with the difference data ID "001" stored in the difference management table 59A for the storage apparatus ID "00100A" is stored at "8:11:36:38," and has a data size of "32. 1414," a start LBA of "784A5D," and last LBA of "864AAE."

FIG. 7 shows a configuration for the host I/O management table 60A. The host I/O management table 60A contains information necessary for managing the storage apparatus that I/O accesses the operation server 2.

The host I/O management table 60A includes: a storage apparatus ID column 91A for managing the storage apparatus ID for the storage apparatus holding this host I/O management table 60A; a connected storage apparatus ID column 92A for managing the storage apparatus IDs for the storage apparatus connected to the management server 2; an I/O access column 93A for managing whether or not the relevant storage apparatus is I/O accessing the management server 2; and a performance value column 94A for managing performance values in the storage apparatus.

In the table, "ON" or "OFF" is registered in the I/O access column 93A. If "ON" is registered in the I/O access column 93A, the relevant storage apparatus is I/O accessing the management server 2. If "OFF" is registered in the I/O access column 93A, the relevant storage apparatus is not I/O accessing with the management server 2.

For example, the storage apparatus with the storage apparatus ID "00100A" stored in the host I/O management table 60A for the storage apparatus ID "00100A" is I/O accessing the management server 2, and its performance value is "38392."

The volume information management table 58B, difference management table 59B, and host I/O management table 60B have the same configuration respectively as the volume information management table 58A, the difference management table 59A, and the host I/O management table 60A. Accordingly, the same columns in the volume management table 58B, the difference management table 59B, and the host I/O management table 60B as the columns in the volume management table 58A, the difference management table 59A, and the host management table 60A shown in FIGS. 5 to 7 have the same reference number followed by a suffix "B." instead of "A."

5. Processing Based on Various Programs 5-1. Data Rearrangement Processing

Next, data rearrangement processing that takes place in accordance with the data rearrangement program 54A in the storage system 1 in this embodiment will be described.

Figure 8:
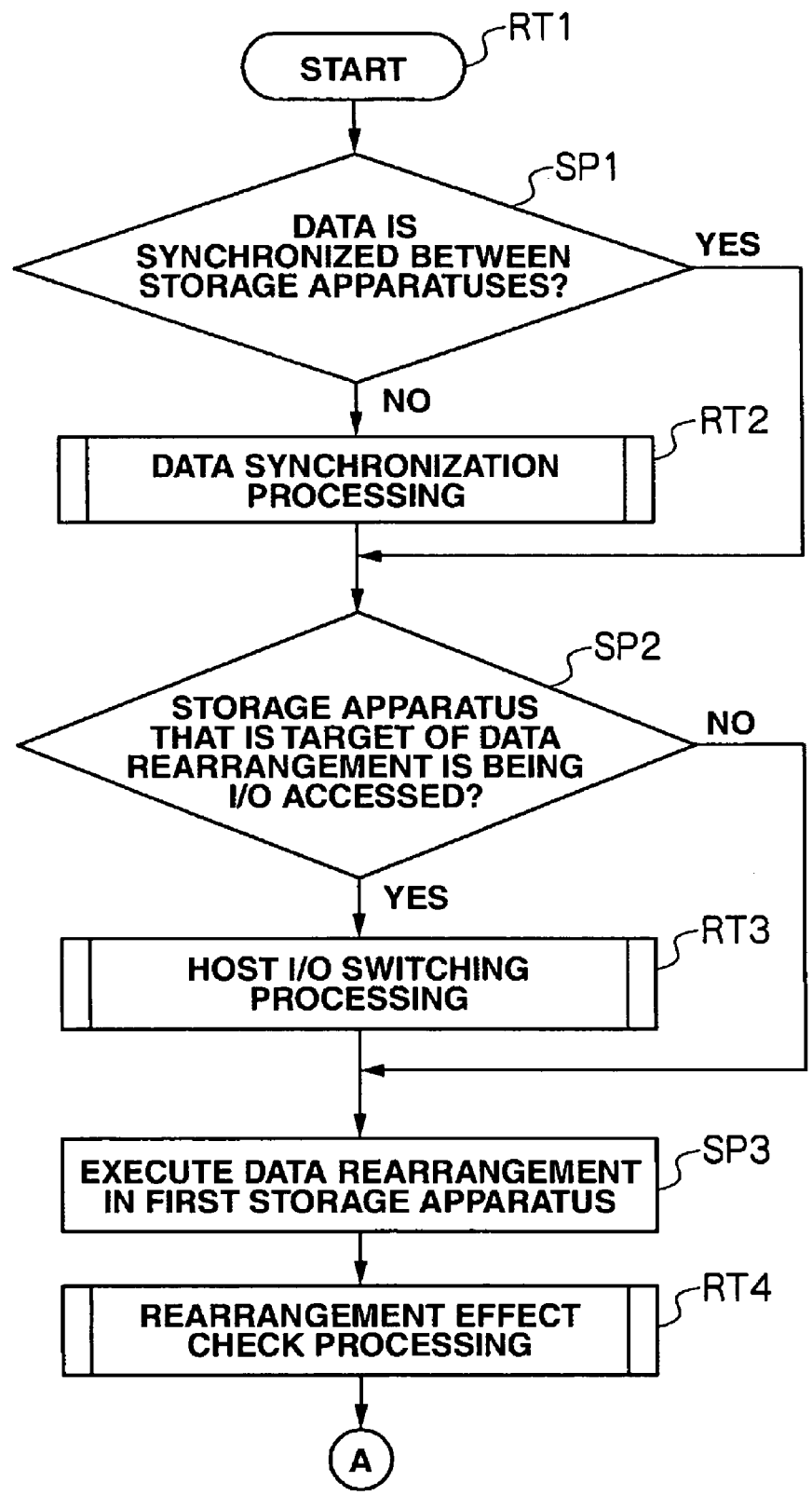
FIG. 8 is a flowchart illustrating a data rearrangement processing routine.
Figure 9:
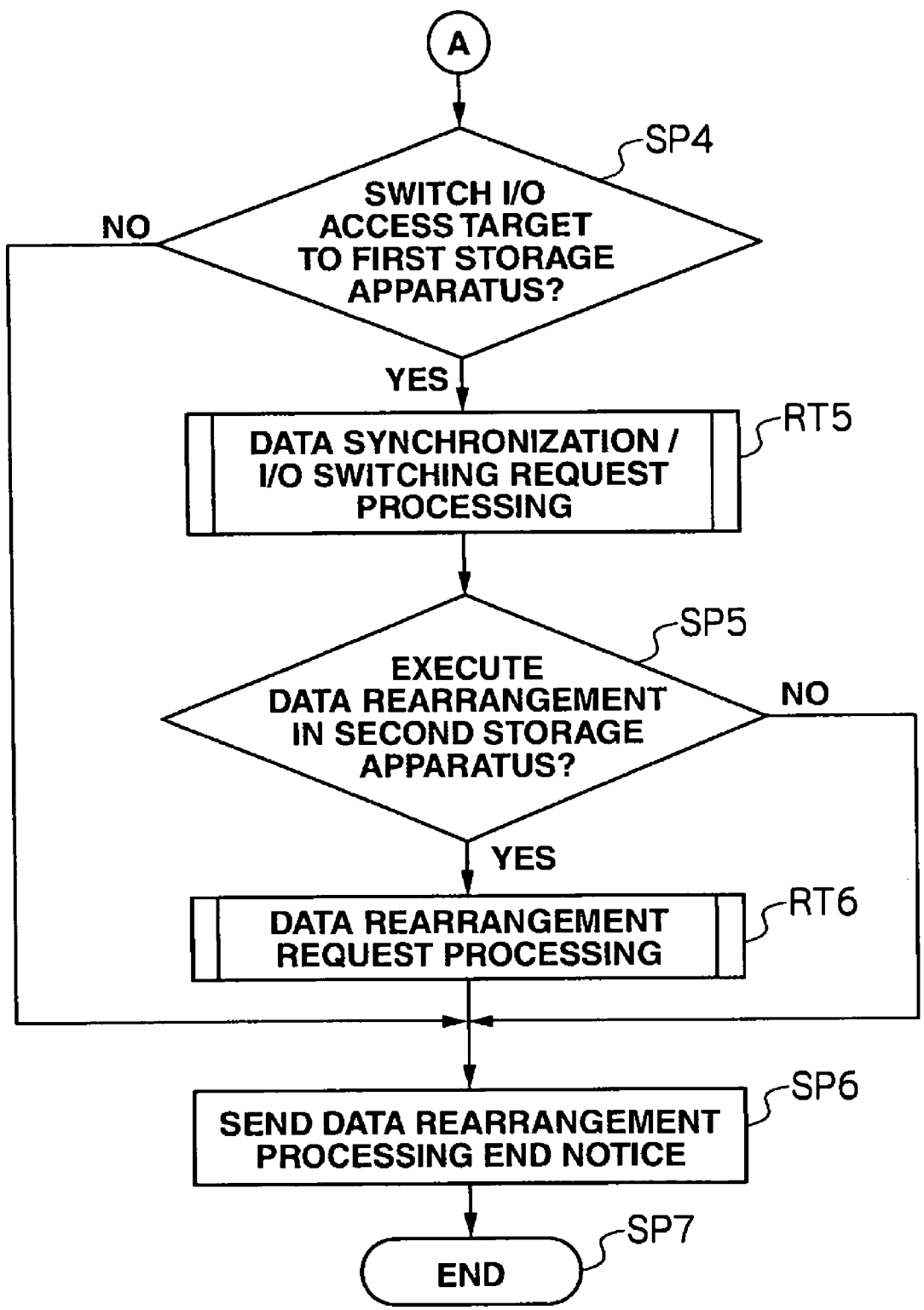
FIG. 9 is a flowchart illustrating a data rearrangement processing routine.

FIGS. 8 and 9 are flowcharts showing an example of a specific sequence concerning that data rearrangement processing in the first storage apparatus 3 in the storage system 1 when it is executed by the disk adapter 26A.

In this example, when the management server 6 runs the data rearrangement control program 42 when a pool volume 62A is added to the pool area 64A, or in accordance with the operation of the management server 6 by an administrator, and sends a request for data rearrangement in a predetermined virtual volume 61A to the disk adapter 26A in the first storage apparatus 3, the disk adapter 26A, after receiving the above data rearrangement request and in accordance with the data rearrangement processing routine RT1 shown in FIGS. 8 and 9, runs the data rearrangement program 54A and judges whether or not data has been synchronized between the first and second storage apparatuses 3 and 4, (SP1).

More specifically, in this example, the disk adapter 26A in the first storage apparatus 3 refers to the difference management table 59A, and determines, if any difference data ID is held, that the data is not synchronized, or determines, if no difference data ID is held, that the data is synchronized.

If the data has been synchronized (SP1: YES), the disk adapter 26A in the first storage apparatus 3 proceeds to step SP2. Meanwhile, if the data has not been synchronized (SP1: NO), the disk adapter 26A in the first storage apparatus 3 synchronizes the data by running the data synchronization program 51 (RT2), which will be described later.

After that, the disk adapter 26A in the first storage apparatus 3 judges whether or not the host I/O processing program 52A is being run and I/O access is taking place at present to the storage apparatus that is the current target of the data rearrangement (SP2).

More specifically, in this example, the disk adapter 26A in the first storage apparatus 3 refers to the host I/O management table 60A. If "ON" is registered in the entry for the storage apparatus ID "00100A" in the I/O access column 93A, the disk adapter 26A determines that the host I/O access program 52A is being run and I/O access is taking place. Meanwhile, if "OFF" is registered in the entry for the storage apparatus ID "00100A" in the I/O access column 93A, the disk adapter 26A determines that no host I/O access is taking place.

If no "I/O" access is taking place (SP2: NO), the disk adapter 26A in the first storage apparatus 3 proceeds to step SP3. If I/O access is taking place (SP2: YES), the disk adapter 26A in the first storage apparatus 3 executes the host I/O switching processing by running the host I/O switching program 53A (RT3), which will be described later.

After that, in this example, the disk adapter 26A in the first storage apparatus 3 runs the data rearrangement execution program in the data rearrangement program 54A to rearrange the data stored in that pool volume 62A by averaging the amount of data stored in the pool volumes 62A used by the virtual volume 61A and executing data rearrangement in the first storage apparatus 3 (SP3).

Next, the disk adapter 26A in the first storage apparatus 3 executes the rearrangement effect check processing by running the rearrangement effect check program 55A (RT4), which will be described later.

Next, the disk adapter 26A in the first storage apparatus 3 determines whether or not to switch the I/O access target so that the operation server 2, which I/O accessed the second storage apparatus 4, instead I/O accesses the first storage apparatus 3 (SP4).

If the I/O access target is not switched to the first storage apparatus 3 (SP4: NO), i.e., if the I/O access is continuously made between the operation server 2 and the second storage apparatus 4, the disk adapter 26A in the first storage apparatus 3 proceeds to step SP6. Meanwhile, if the I/O access target is switched to have the operation server 2 I/O access the first storage apparatus 3 (SP4: YES), the disk adapter 26A in the first storage apparatus 3 executes the data synchronization/I/O switching request processing by running the data synchronization/I/O switching request program 56A (RT5), which will be described later.

Next, the disk adapter 26A in the first storage apparatus 3 judges, in accordance with the data rearrangement request received from the management server 6, whether or not to execute data rearrangement in the second storage apparatus 4 (SP5).

If the data rearrangement in the second storage apparatus is not executed (SP5: NO), the disk adapter 26A in the first storage apparatus 3 proceeds to step SP6. Meanwhile, if the data rearrangement in the second storage apparatus 4 is executed (SP5: YES), the disk adapter 26A in the first storage apparatus 3 executes the data rearrangement request processing by running the data rearrangement request program 57A (RT6), which will be described later.

Next, the disk adapter 26A in the first storage apparatus 3 sends, to the management server 6, a data rearrangement processing end notice indicating that the data rearrangement processing routine has finished without incident (SP6), and ends the data rearrangement processing routine RT1 shown in FIGS. 8 and 9 by terminating the data rearrangement program 54A (SP7).

5-2. Data Synchronization Processing

Data synchronization processing that takes place in accordance with the data synchronization program 51 in the storage system 1 in this embodiment will be described.

Figure 10:
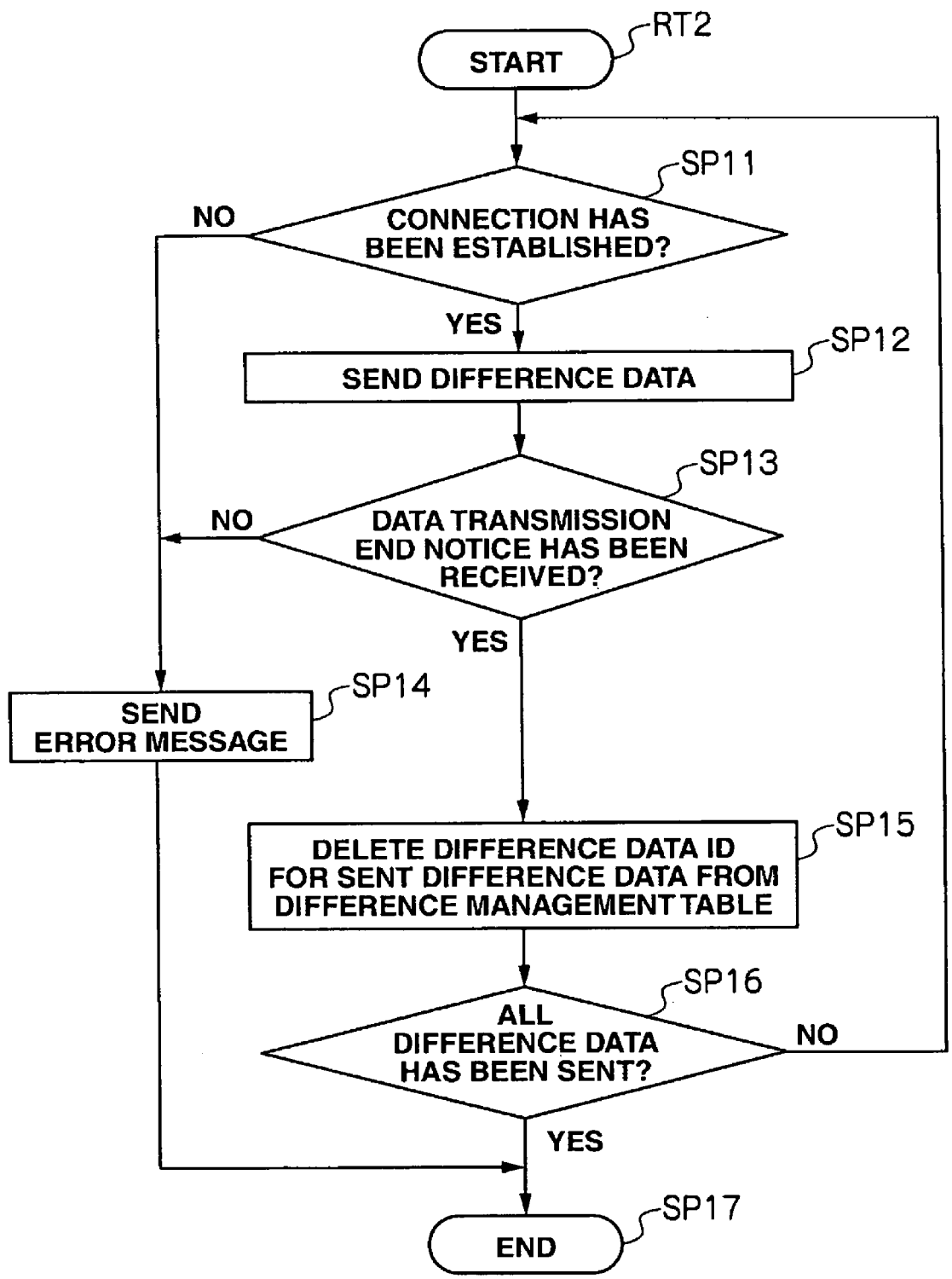
FIG. 10 is a flowchart illustrating a data synchronization processing routine.

FIG. 10 is an flowchart showing an example of a specific sequence concerning that data synchronization processing in the first storage apparatus 3 in the storage system 1 when it is executed by the disk adapter 26A.

In this example, if data is not synchronized (SP1: NO), the disk adapter 26A in the first storage apparatus 3 runs the data synchronization program 51A, sends, in accordance with the data synchronization processing routine RT2 shown in FIG. 10, a response request to the second storage apparatus 4 via the connector 23A, the channel adapter 22A, and the signal line 30, and judges, based on the response—or lack thereof—to the request, whether or not connection with the second storage apparatus 4 has been established (SP11).

If connection with the second storage apparatus 4 has not been established (SP11: NO), the disk adapter 26A in the first storage apparatus 3 proceeds to step SP14. Meanwhile, if connection with the second storage apparatus 4 has been established (SP11: YES), the disk adapter 26 in the first storage apparatus 3 refers to the difference management table 59A, selects a predetermined difference data ID, and sends the difference data corresponding to that difference data ID to the second storage apparatus 4 via the connector 23A, the channel adapter 22A, and the signal line 30 (SP12).

The disk adapter 26B in the second storage apparatus 4 stores, after receiving the difference data via the channel adapter 22B and the connector 23B, the received difference data in the disk device 12B for the pool volume 62B used by the corresponding virtual volume 61B, and sends a data transmission end notice to the first storage apparatus 3 via the connector 23B, the channel adapter 22B, and the signal line 30.

Next, the disk adapter 26A in the first storage apparatus 3 judges whether or not the data transmission end notice has been received from the second storage apparatus 4 via the channel adapter 22A and the connector 23A (SP13).

More specifically, in this example, the disk adapter 26A in the first storage apparatus 3 waits for the data transmission end notice from the second storage apparatus 4 for a predetermined period of time, and determines, if the data transmission end notice is not received within the predetermined period of time, that the notice has not been received from the second storage apparatus 4, or determines, if the data transmission end notice is received within that period of time, that the notice has not been received from the second storage apparatus 4.

If the data transmission end notice has not been received from the second storage apparatus 4 (SP13: NO), the disk adapter 26A in the first storage apparatus 3 sends an error message to the management server 6 (SP14), and ends the data synchronization processing routine RT2 shown in FIG. 10 by terminating the data synchronization program 51A (SP17). After that, the disk adapter 26A in the first storage apparatus 3 ends the data rearrangement processing routine RT1 shown in FIGS. 8 and 9 by terminating the data rearrangement program 54A (SP7).

Meanwhile, if the data transmission end notice has been received from the second storage apparatus 4 (SP13: YES), the disk adapter 26A in the first storage apparatus 3 deletes the above sent difference data ID from the difference management table 59A (SP15).

Next, the disk adapter 26A in the first storage apparatus 3 judges whether or not all difference data has been sent to the second storage apparatus 4 (SP16).

More specifically, in this example, the disk adapter 26A in the first storage apparatus 3 refers to the difference management table 59A, and determines, if any difference data IDs are still held, that not all difference data has been sent, or determines, if no difference data IDs are held, that all difference data has been sent.

If not all difference data has been sent (SP16: NO), the disk adapter 26A in the first storage apparatus 3 returns to step SP11 and judges again whether or not connection with the second storage apparatus 4 has been established (SP11). After that, the above described steps are repeated (SP11-SP16).

Meanwhile, if all difference data has been sent (SP16: YES), the disk adapter 26A in the first storage apparatus 3 ends the data synchronization processing routine RT2 shown in FIG. 10 by terminating the data synchronization program 51A (SP17).

5-3. Host I/O Switching Processing

Next, host I/O switching processing that takes place in accordance with the host I/O switching program 53A in the storage system 1 in this embodiment will be described.

Figure 11:
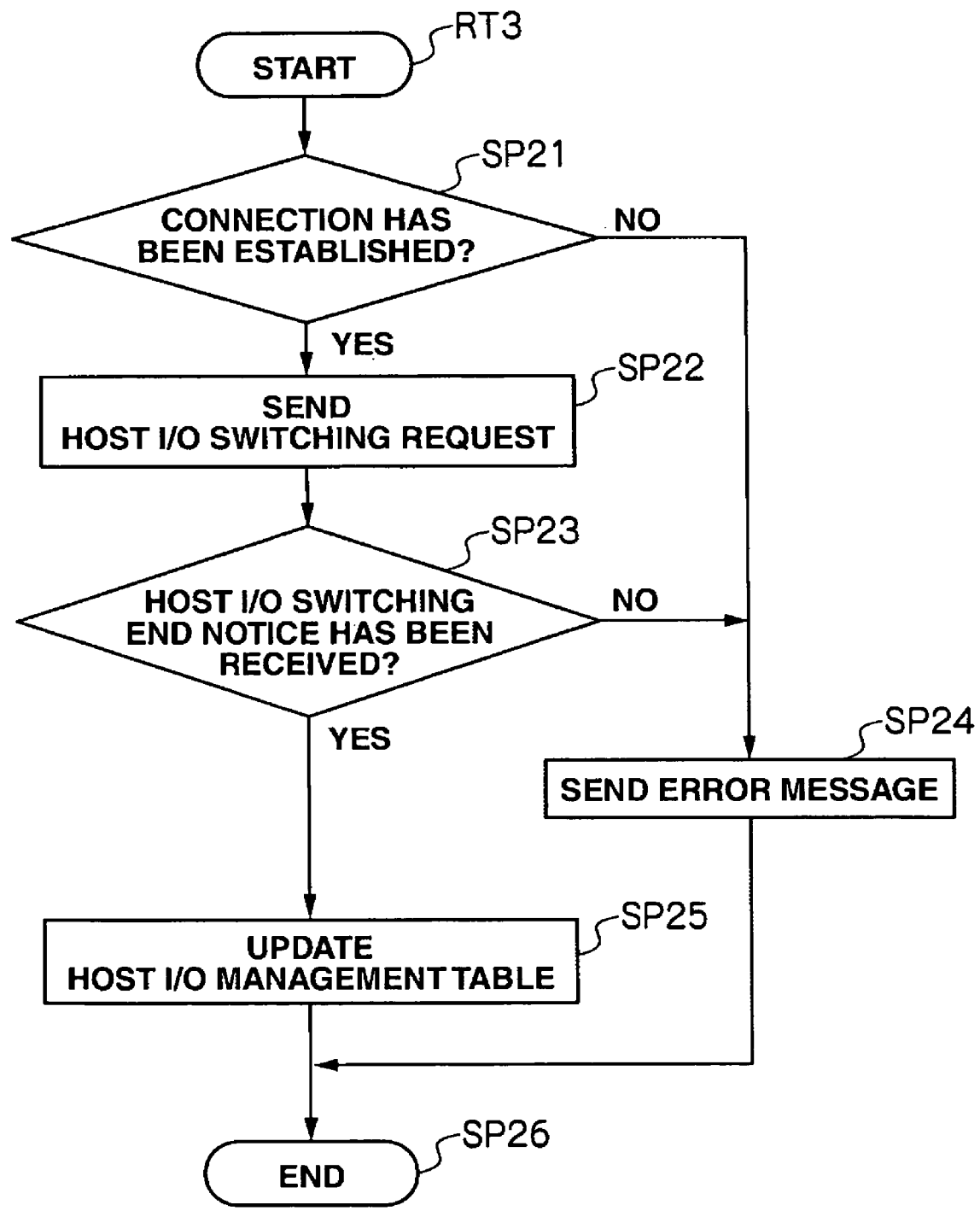
FIG. 11 is a flowchart illustrating a host I/O switching processing routine.

FIG. 11 is a flowchart showing an example of a specific sequence concerning that host I/O switching processing in the first storage apparatus 3 in the storage system 1 when it is executed by the disk adapter 26A.

If I/O access is taking place (SP2: YES), the disk adapter 26A in the first storage apparatus 3 runs the host I/O switching processing 53A and judges, in accordance with the host I/O switching processing routine RT3 shown in FIG. 11, whether or not connection with the second storage apparatus 4 has been established (SP21).

If connection with the second storage apparatus 4 has not been established (SP21: NO), the disk adapter 26A in the first storage apparatus 3 proceeds to step SP24. Meanwhile, if connection with the second storage apparatus 4 has been established (SP21: YES), the disk adapter 26A in the first storage apparatus 3 sends, to the operation server 2 via the connector 23A, the channel adapter 22A, and the FC switch 5, a host I/O switching request for switching the I/O access target from the first storage apparatus 3 to the second storage apparatus 4 (SP22). In the present invention, if more than two storage apparatuses are used, the above request may be a request that the I/O access target is switched from the first storage apparatus 3 to any of the other storage apparatuses.

The CPU in the operation server 2 runs, after receiving the host I/O switching request, the host I/O switching program 32 to switch the I/O access target so that the operation server 2, which I/O accessed the first storage apparatus 3, instead I/O accesses the second storage apparatus 4, and send a host I/O switching end notice to the first storage apparatus 3 via the FC switch 5.

The disk adapter 26A in the first storage apparatus 3 judges whether or not the host I/O switching end notice has been received from the operation server 2 via the channel adapter 22A and the connector 23A (SP23).

More specifically, in this example, the disk adapter 26A in the first storage apparatus 3 waits for the host I/O switching end notice from the operation server 2 for a predetermined period of time, and determines, if the host I/O switching end notice is not received within the predetermined period of time, that the notice has not been received from the operation server 2, or determines, if the host I/O switching end notice is received within that period of time, that the notice has been received from the operation server 2.

If the host I/O switching end notice has not been received from the operation server 2 (SP23: NO), the disk adapter 26A in the first storage apparatus 3 sends an error message to the management server 6 (SP24), and ends the host I/O switching processing routine RT3 shown in FIG. 11 by terminating the data synchronization program 51A (SP26). After that, the disk adapter 26A in the first storage apparatus 3 ends the data rearrangement processing sequence RT1 shown in FIGS. 8 and 9 by terminating the data rearrangement program 54A (SP7).

Meanwhile, if the host I/O switching end notice has been received from the operation server 2 (SP23: YES), the disk adapter 26A in the first storage apparatus 3 updates the host I/O management table 60A (SP26).

More specifically, in this example, the disk adapter 26A in the first storage apparatus 3 refers to the host I/O management table 60A, and changes the entry for the storage apparatus ID "00100A" in the I/O access column 93A from "ON" to "OFF," and the entry for the storage apparatus ID "00100B" in the I/O access column 93A from "OFF" to "ON."

After that, the disk adapter 26A in the first storage apparatus 3 ends the data synchronization processing routine RT2 shown in FIG. 10 by terminating the host I/O switching program 53A (SP26).

5-4. Rearrangement Effect Check Processing

Next, rearrangement effect check processing that takes place in accordance with the rearrangement effect check program 54A in the storage system 1 in this embodiment will be described.

Figure 12:
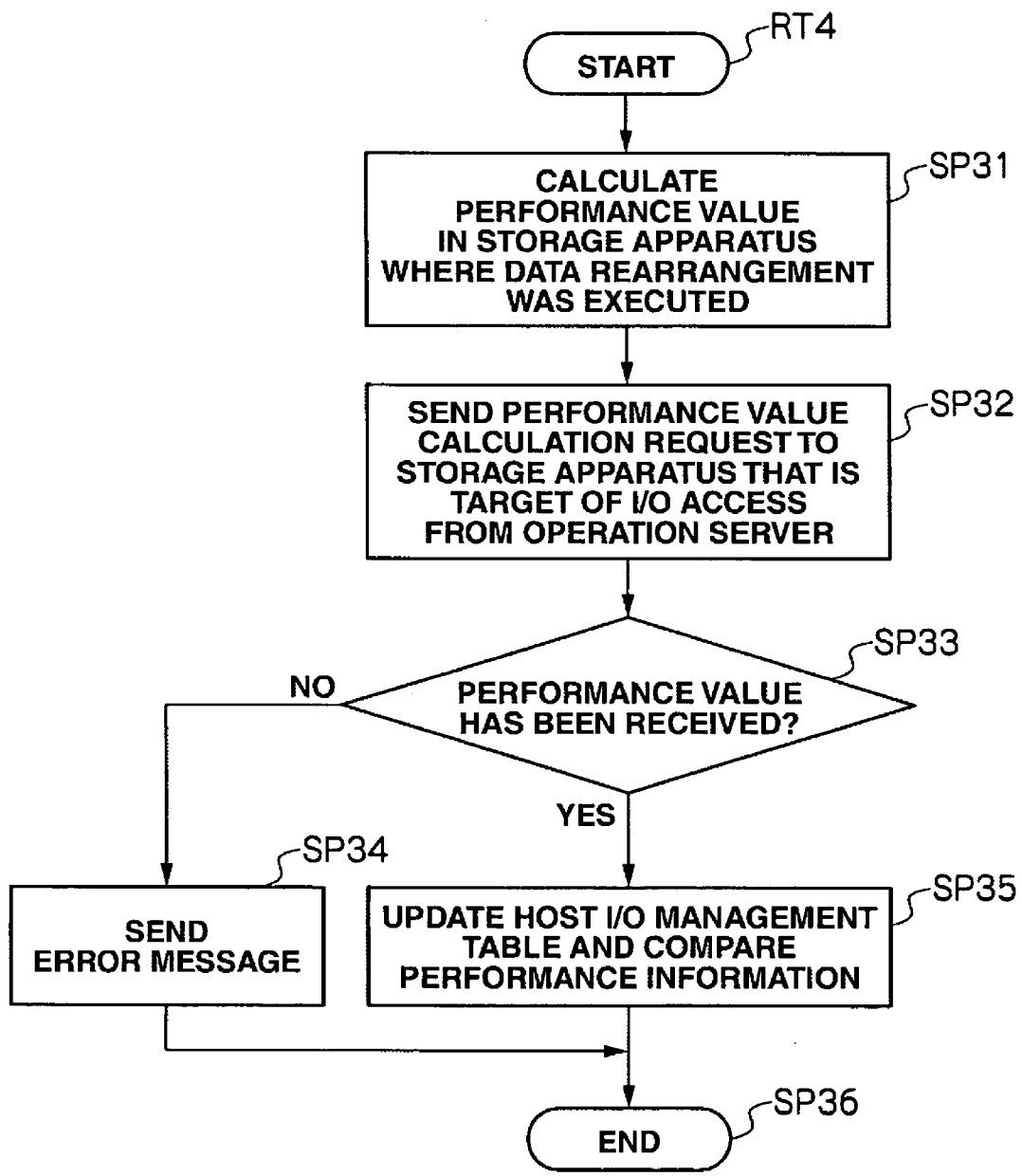
FIG. 12 is a flowchart illustrating a rearrangement effect check processing routine.

FIG. 12 is a flowchart showing an example of a specific sequence concerning that rearrangement effect check processing in the first storage apparatus 3 in the storage system 1 when it is executed by the disk adapter 26A.

The disk adapter 26A in the first storage apparatus 3 runs, after executing the data rearrangement in the first storage apparatus 3, the rearrangement effect check program 54A, and calculates, in accordance with the rearrangement effect check processing routine RT4 shown in FIG. 12, a performance value indicating performance concerning data response to the operation server 2 and updates the host I/O management table 60A (SP31).

More specifically, in this example, the disk adapter 26A in the first storage apparatus 3 refers to the volume information management table 58A, calculates an I/O access performance value in the first storage apparatus 3 based on the RAID level in each pool volume 62A, the drive type, the number of drive rotations, the used capacity, and the usage status of the disk device 12A, or similar, and registers the calculated performance value in the entry for the storage apparatus ID "00100A" in the performance value column 94A in the host I/O management table 60A.

Next, the disk adapter 26A in the first storage apparatus 3 sends a performance value calculation request to the storage apparatus the operation server 2 is I/O accessing (SP32).

More specifically, in this example, the disk adapter 26A in the first storage apparatus 3 sends the performance value calculation request to the second storage apparatus 4 the operation server 2 is currently I/O accessing after the completion of the host I/O switching processing, via the connector 23A, the channel adapter 22A, and the signal line 30.

The disk adapter 26B in the second storage apparatus 4 runs, after receiving the performance value calculation request via the channel adapter 22B and the connector 23B, the rearrangement effect check program 54A, then, for example, refers to the volume information management table 58B, calculates the I/O access performance value in the second storage apparatus 4 based on the RAID level in each pool volume 62A, and the drive type, the number of drive rotations, the used capacity, and the usage status of the disk device 12B, and sends the thus-calculated performance value to the first storage apparatus 3 via the connector 23B, the channel adapter 22B, and the signal line 30.

Next, the disk adapter 26A in the first storage apparatus 3 judges whether or not the performance value in the second storage apparatus 4 has been received from the second storage apparatus 4 via the channel adapter 22A and the connector 23A (SP33).

More specifically, in this example, the disk adapter 26A in the first storage apparatus 3 waits for the performance value from the second storage apparatus 4 for a predetermined period of time, and determines, if the performance value is not received within the predetermined period of time, that the performance value has not been received from the second storage apparatus 4, or determines, if the performance value is received within that period of time, that the performance value has been received from the second storage apparatus 4.

If the performance value has not been received from the second storage apparatus 4 (SP33: NO), the disk adapter 26A in the first storage apparatus 4 sends an error message to the management server 6 (SP34), and ends the rearrangement effect check processing routine RT4 shown in FIG. 12 by terminating the rearrangement effect check program 54A (SP36). After that, the disk adapter 26A in the first storage apparatus 3 ends the data rearrangement processing routine RT1 shown in FIGS. 8 and 9 by terminating the data rearrangement program 54A (SP7).

Meanwhile, if the performance value has been received from the second storage apparatus 4 (SP33: YES), the disk adapter 26A in the first storage apparatus 3 updates the host I/O management table 60A and compares two performance values (SP35).

More specifically, in this example, the disk adapter 26A in the first storage apparatus 3 stores the performance value sent from the second storage apparatus 4 in the entry for the storage apparatus ID "00100B" in the performance value column 94A in the host I/O management table 60A. The disk adapter 26A in the first storage apparatus 3 then refers to the host I/O management table 60A and compares the calculated performance value in the first storage apparatus 3 with the received performance value in the second storage apparatus 4.

If the performance value in the second storage apparatus 4 is higher than the performance value in the first storage apparatus 3, the disk adapter 26A decides to not switch the I/O access target to the first storage apparatus 3. Meanwhile, if the performance value in the first storage apparatus 3 is higher than the performance value in the second storage apparatus 4, the disk adapter 26A decides to switch the I/O access target to the first storage apparatus 3.

After that, the disk adapter 26A in the first storage apparatus 3 ends the rearrangement effect check processing routine RT4 shown in FIG. 12 by terminating the rearrangement effect check program 54A (SP36).

5-5. Data Synchronization/Host I/O Switching Request Processing

Next, data synchronization/host I/O switching request processing that takes place in accordance with the data synchronization/host I/O switching request program 56A in the storage system 1 in this embodiment will be described.

Figure 13:
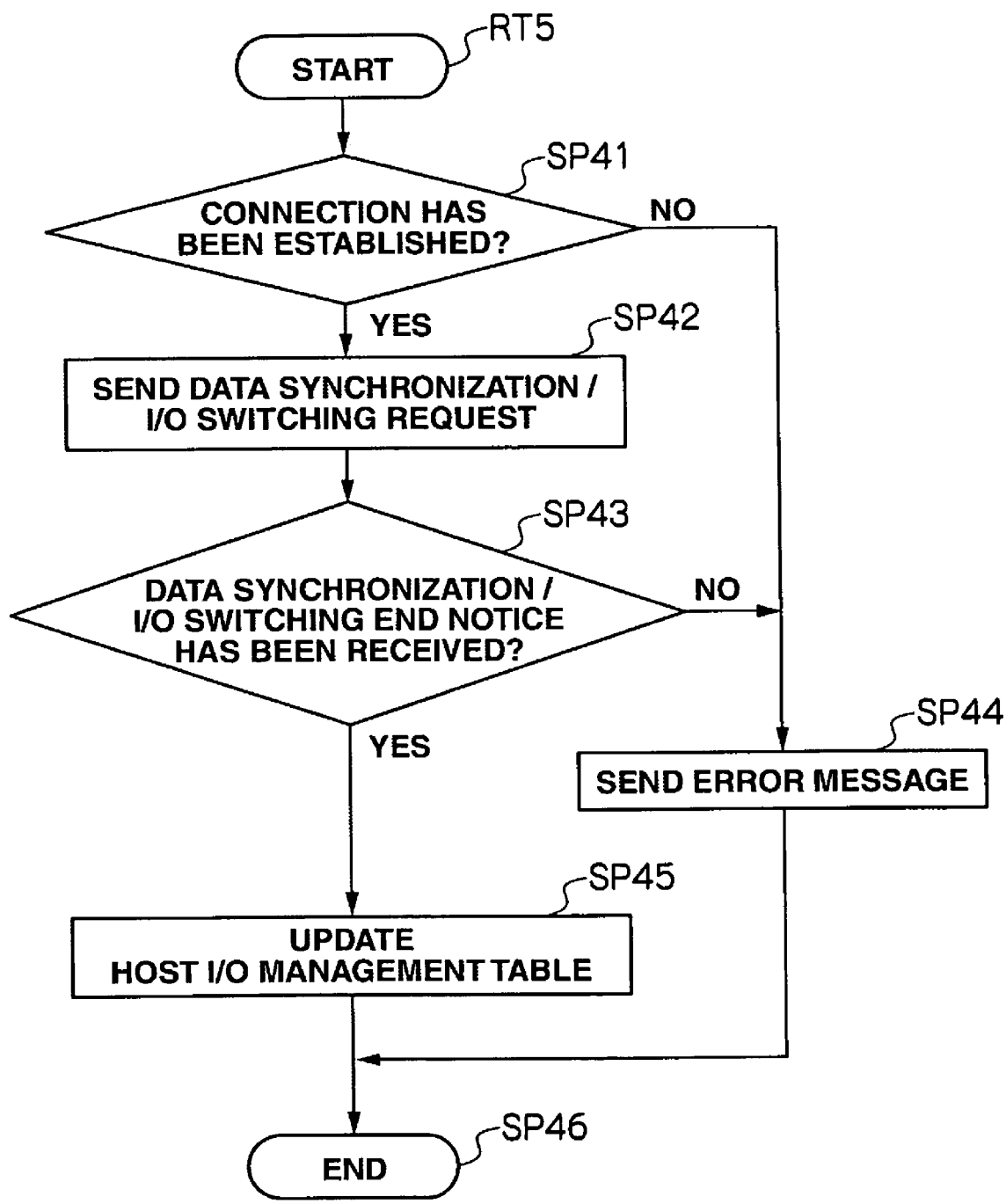
FIG. 13 is a flowchart illustrating a data synchronization/host I/O switching request processing routine.

FIG. 13 is a flowchart showing an example of a specific sequence concerning that data synchronization/host I/O switching request processing in the first storage apparatus 3 in the storage system 1 when it is executed by the disk adapter 26A.

If the disk adapter 26A in the first storage apparatus 3 switches the I/O access target to the first storage apparatus 3 (SP4: YES), the disk adapter 26A runs the data synchronization/host I/O switching request program 56A, and judges, in accordance with the data synchronization/host I/O switching request processing routine RT5 shown in FIG. 13, whether or not connection with the second storage apparatus 4 has been established (SP41).

If no connection with the second storage apparatus 4 has been established (SP41: NO), the disk adapter 26A in the first storage apparatus 3 proceeds to step SP44. Meanwhile, if connection with the second storage apparatus 4 has been established (SP41: YES), the disk adapter 26A in the first storage apparatus 3 sends a data synchronization/host I/O switching request to the second storage apparatus 4 via the connector 23A, the channel adapter 22A, and the FC switch 5 (SP42).

The disk adapter 26B in the second storage apparatus 4 runs, after receiving the host synchronization/host I/O switching request via the channel adapter 22B and the connector 23B, the data synchronization program 51B and executes the same processing as the above described data synchronization processing routine RT2 shown in FIG. 10. After that, the disk adapter 26B in the second storage apparatus 4 runs the host I/O switching program 53B and executes the same processing as the above described host I/O switching processing routine RT3 shown in FIG. 11.

If the same processing as the data synchronization processing routine RT2 and the host I/O switching processing routine RT3 is finished without incident, the disk adapter 26B in the second storage apparatus 4 sends the data synchronization/host I/O switching end notice to the first storage apparatus 3 via the connector 23B, the channel adapter 22B, and the signal line 30. In the same processing as that in the data synchronization processing routine RT2 and the host I/O switching processing routine RT3 above, the components in the first storage apparatus 3 are replaced with those in the second storage apparatus 4, and the components in the second storage apparatus 4 are replaced with those in the first storage apparatus 3.

After that, the disk adapter 26A in the first storage apparatus 3 judges whether or not the data synchronization/host I/O switching end notice has been received from the second storage apparatus 4 via the channel adapter 22A and the connector 23A (SP43).

More specifically, in this example, the disk adapter 26A in the first storage apparatus 3 waits for the data synchronization/host I/O switching end notice from the second storage apparatus 4 for a predetermined period of time, and determines, if the data synchronization/host I/O switching end notice is not received within the predetermined period of time, that the notice has not been received from the second storage apparatus 4, or determines, if the data synchronization/host I/O switching end notice is received within that period of time, that the notice has been received from the second storage apparatus 4.

If the disk adapter 26A in the first storage apparatus 3 has not received the data synchronization/host I/O switching end notice from the second storage apparatus 4 (SP43: NO), the disk adapter 26A sends an error message to the management server 6 (SP44), and ends the data synchronization/host I/O switching request processing routine RT5 shown in FIG. 13 by terminating the data synchronization/host I/O switching request program 56A (SP46). After that, the disk adapter 26A in the first storage apparatus 3 ends the data rearrangement processing routine RT1 shown in FIGS. 8 and 9 by terminating the data rearrangement program 54A (SP7).

Meanwhile, if the data synchronization/host I/O switching end notice has been received from the second storage apparatus 4 (SP 43: YES), the disk adapter 26A in the first storage apparatus 3 updates the host I/O management table 60A (SP45).

More specifically, in this example, the disk adapter 26A in the first storage apparatus 3 refers to the host I/O management table 60A, changes the entry for the storage apparatus ID "00100B" in the I/O access column 93A from "ON" to "OFF" and the entry for the storage apparatus ID "00100A" in the I/O access column 93A from "OFF" to "ON."

After that, the disk adapter 26A in the first storage apparatus 3 ends the data synchronization/host I/O switching request processing routine RT5 shown in FIG. 13 by terminating the data synchronization/host I/O switching request program 56A (SP46).

5-6. Data Rearrangement Request Processing

Next, data rearrangement request processing that takes place in accordance with the data rearrangement request program 57A in the storage system 1 in this embodiment will be described.

Figure 14:
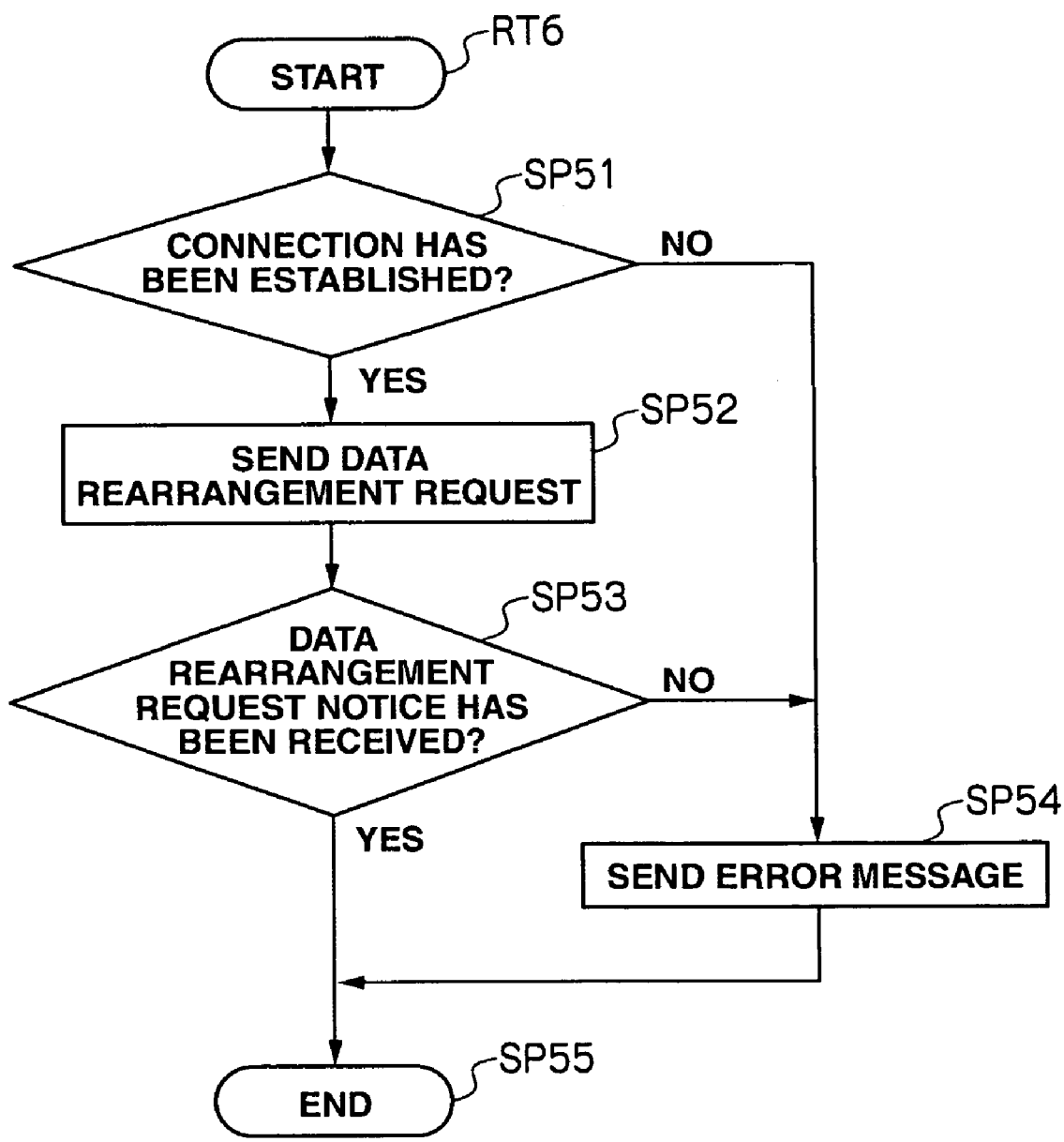
FIG. 14 is a flowchart illustrating a data rearrangement request processing routine.

FIG. 14 is a flowchart showing an example of a specific sequence concerning that data rearrangement request processing in the first storage apparatus 3 in the storage system 1 when it is executed by the disk adapter 26A in the first storage apparatus 3.

If the data rearrangement is executed in the second storage apparatus 4 (SP5: YES), the disk adapter 26A in the first storage apparatus 3 runs the data rearrangement request program 57A and judges, in accordance with the data rearrangement request processing routine RT6 shown in FIG. 14, whether or not connection with the second storage apparatus 4 has been established (SP51).

If connection with the second storage apparatus 4 has not been established (SP51: NO), the disk adapter 26A in the first storage apparatus 3 proceeds to step SP54. Meanwhile, if connection with the second storage apparatus 4 has been established (SP51: YES), the disk adapter 26A sends a data rearrangement request to the second storage apparatus 4 via the connector 23A, the channel adapter 22A, and the FC switch 5 (SP52).

When doing so, the disk adapter 26B in the second storage apparatus 4, after receiving the data rearrangement request via the channel adapter 22B and the connector 23B, executes the same processing as in step SP3 shown in FIG. 8 described above by running the data rearrangement execution program in the data rearrangement program 54B.

If the same processing as step SP3 above is finished without incident, the disk adapter 26B in the second storage apparatus 4 sends a data rearrangement end notice to the first storage apparatus 3 via the connector 23B, the channel adapter 22B, and the signal line 30. In the same processing as to that in step SP3 above, the components in the first storage apparatus 3 are replaced with those in the second storage apparatus 4, and the components in the second storage apparatus 4 are replaced with those in the first storage apparatus 3.

Next, the disk adapter 26A in the first storage apparatus 3 judges whether or not the data rearrangement end notice has been received from the second storage apparatus 4 via the channel adapter 22A and the connector 23A (SP53).

More specifically, in this example, the disk adapter 26A in the first storage apparatus 3 waits for the data rearrangement end notice from the second storage apparatus 4 for a predetermined period of time, and determines, if the data rearrangement end notice is not received within the predetermined period of time, that the notice has not been received from the second storage apparatus 4, or determines, if the data rearrangement end notice is received within that period of time, that the notice has been received from the second storage apparatus 4.

If the data rearrangement end notice has not been received from the second storage apparatus 4 (SP53: NO), the disk adapter 26A in the first storage apparatus 3 sends an error message to the management server 6 (SP54), and ends the data rearrangement request processing routine RT6 shown in FIG. 14 by terminating the data rearrangement request program 57A (SP55). After that, the disk adapter 26A in the first storage apparatus 3 ends the data rearrangement processing routine RT1 shown in FIGS. 8 and 9 by terminating the data rearrangement program 54A (SP7).

Meanwhile, if the data rearrangement end notice has been received from the second storage apparatus 4 (SP53: YES), the disk adapter 26A in the first storage apparatus 3 ends the data rearrangement request processing routine RT6 shown in FIG. 14 by terminating the data rearrangement request program 57A (SP55).

After that, if necessary, the disk adapter 26B in the second storage apparatus 4 may execute the same processing as the rearrangement effect check processing routine RT4 shown in FIG. 12 described above by running the rearrangement effect check program 55B, and execute the same processing as the data synchronization/host I/O switching request processing routine RT5 shown in FIG. 13 described above by running the data synchronization/host I/O switching request program 56B. In that case, in the same processing as the rearrangement effect check processing routine RT4 and the data synchronization/host I/O switching request processing routine RT5 described above, the components in the first storage apparatus 3 are replaced with those in the second storage apparatus 4, and the components in the second storage apparatus 4 are replaced with those in the first storage apparatus 3.

In the above described manner, in the storage system 1, the disk adapter 26A sends the host I/O switching request to the operation server 2 when executing the data rearrangement in the pool volumes 62A. In the storage system 1, the operation server 2 switches, after receiving the host I/O switching request, the data transmission target so that the write data, which has been directed to the virtual volume 61A in the first storage apparatus 3, is then directed to the virtual volume 61B in the second storage apparatus 4. After that, in the storage system 1, the disk adapter 26A rearranges data in the pool volume 62A after switching the data transmission target from the virtual volume in the first storage apparatus to the virtual volume in the second storage apparatus.

With that configuration, requests from the operation server 2 are received by a storage apparatus other than the storage apparatus in which the data rearrangement is being executed, so the data rearrangement does not affect the I/O access and can be executed without temporarily stopping the operation server 2 from sending requests. Accordingly, it is possible to effectively prevent a deterioration in response performance occurring when requests from the operation server 2 cannot be received during data rearrangement.

In the storage system 1, the disk adapter 26A calculates, after executing the data rearrangement in the pool volume 62A, a performance value that indicates the data response performance in the first storage apparatus 3, and compares the calculated performance value with a performance value that indicates the data response performance in the second storage apparatus 4. If the data response performance value in the first storage apparatus 3 is higher than the data response performance value in the second storage apparatus 4, the operation server 2 in the storage system 1 switches data transmission target so that the write data originally directed to the virtual volume 61B in the second storage apparatus 4 is sent to the virtual volume 61A in the first storage apparatus 3.

With that configuration, a storage apparatus with performance improved by the data rearrangement can be used, and accordingly, the entire system performance can be further improved.

Moreover, in the storage system 1, free resources in the pool areas 64A and 64B can be effectively used by having the disk adapter 26A/26B rearrange data in the pool volume 62A/62B in the pool area 64A/64B.

The present invention can be applied to a wide range of storage systems for backing up data between storage apparatuses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
a host computer sending various kinds of requests and write data;
a first storage apparatus having a first virtual volume that can be dynamically extended and that is provided to the host computer, and a first volume allocated to the first virtual volume, the first volume being a volume where data sent from the host computer is written;
a second storage apparatus having a second virtual volume backing up data stored in the first virtual volume, and a second volume allocated to the second virtual volume, the second volume being a volume where data sent from the first storage apparatus is written,
the first storage apparatus further including:
a first transmission unit sending a data transmission switching request for switching a data transmission destination of the write data to the host computer, if data rearrangement in the first volume is executed;
a first rearrangement unit rearranging data in the first volume;
a difference management volume to which difference data for the write data written to the first volume is written;
the host computer including a data transmission switching unit switching the data transmission destination after receiving the data transmission switching request sent from the first transmission unit, so that the write data, which was originally directed to the first virtual volume in the first storage apparatus, is sent to the second virtual volume in the second storage apparatus;
wherein the first rearrangement unit rearranges data in the first volume after the data transmission switching unit switches the transmission destination of the write data from the first virtual volume in the first storage apparatus to the second virtual volume in the second storage apparatus;
if data rearrangement in the first volume is executed:
the first transmission unit sends the data transmission switching request to the host computer after sending the difference data written to the difference management volume to the second virtual volume in the second storage apparatus; and
the first transmission unit sends a data response performance calculation request to the second storage apparatus after the rearrangement unit executes data rearrangement in the first volume;
the second storage apparatus further including:
a second response performance comparison unit calculating a data response performance in the second storage apparatus;
a second transmission unit sending the data response performance in the second storage apparatus to the first storage apparatus; and
a second difference management volume to which difference data for the write data written to the second volume is written;
the first storage apparatus further including a first response performance comparison unit:
calculating a data response performance in the first storage apparatus after the rearrangement unit executes the data rearrangement in the first volume; and
comparing the data response performance in the first storage apparatus with the data response performance in the second storage apparatus;
if the data response performance in the first storage apparatus is higher than the data response performance in the second storage apparatus:
the data transmission switching unit switches the transmission destination of the write data from the second virtual volume in the second storage apparatus to the first virtual volume in the first storage apparatus; and
the first transmission unit sends the data transmission switching request to the second storage apparatus;
the second transmission unit sends the data transmission switching request to the host computer after sending the difference data written to the second difference management volume to the first virtual volume in the first storage apparatus; and
the data transmission switching unit switches the transmission destination of the write data from the second virtual volume in the second storage apparatus to the first virtual volume in the first storage apparatus after receiving the data transmission switching request sent from the second transmission unit.

2. The storage system according to claim 1, wherein the second storage apparatus includes a second rearrangement unit rearranging data in the second volume if data rearrangement in the second volume is executed, the second response performance comparison unit:
calculates, the data response performance in the second storage apparatus after the second rearrangement unit executes the data rearrangement in the second volume; and
compares the calculated response performance in the second storage apparatus with the data response performance in the first storage apparatus, and
if the data response performance in the second storage apparatus is higher than the data response performance in the first storage apparatus, the data transmission switching unit switches, the data transmission destination from the first virtual volume in the first storage apparatus to the second virtual volume in the second storage apparatus.

3. The storage system according to claim 2, wherein the second transmission unit sends a data response performance calculation request to the first storage apparatus after the second rearrangement unit executes the data rearrangement in the second volume, and
the first response performance comparison unit calculates data response performance in the first storage apparatus and sends the calculated data response performance in the first storage apparatus to the second storage apparatus.

4. A data rearrangement method for a storage system including:
a host computer for sending various kinds of requests and write data;
a first storage apparatus having:
  a first virtual volume that can be dynamically extended and that is provided to the host computer;
  a first volume allocated to the first virtual volume, the first volume being a volume where data sent from the host computer is written; and
  a first difference management volume to which difference data for the write data written to the first volume is written; and
a second storage apparatus having:
  a second virtual volume for backing up data stored in the first virtual volume;
  a second volume allocated to the second virtual volume, the second volume being a volume where data sent from the first storage apparatus is, written; and
  a second difference management volume to which difference data for the write data written to the second volume is written,
the method comprising:
  a first step of sending a data transmission switching request to the host computer for switching the transmission destination of the write data if the data rearrangement in the first volume is executed, wherein the data transmission switching request is sent after sending the difference data written to the first difference management volume to the second virtual volume in the second storage apparatus;
  a second step of switching the transmission destination of the write data from the first virtual volume in the first storage apparatus to the second virtual volume in the second storage apparatus after the host computer receives the data transmission switching request;
  a third step of rearranging data in the first volume after switching the transmission destination of the write data from the first virtual volume in the first storage apparatus to the second virtual volume in the second storage apparatus;
  a fourth step of:
    calculating a data response performance in the first storage apparatus after executing the data rearrangement in the first volume;
    sending a data response performance calculation request to the second storage apparatus after executing the data rearrangement in the first volume;
    calculating a data response performance in the second storage apparatus;
    sending the data response performance in the second storage apparatus to the first storage apparatus; and
    comparing the data response performance in the first storage apparatus with the data response performance in the second storage apparatus;
  a fifth step of switching the transmission destination of the write data from the second virtual volume in the second storage apparatus to the first virtual volume in the first storage apparatus if the data response performance in the first storage apparatus is higher than the data response performance in the second storage apparatus;
  a sixth step of sending the data transmission switching request to the second storage apparatus if the data response performance in the first storage apparatus is higher than the data response performance in the second storage apparatus;
  a seventh step of
    sending the difference data written to the second difference management volume to the first virtual volume in the first storage apparatus; and
    sending the data transmission switching request to the host computer; and
  an eighth step of switching the transmission destination of the write data from the second virtual volume in the second storage apparatus to the first virtual volume in the first storage apparatus after the host computer receives the data transmission switching request.

5. The data rearrangement method according to claim 4, further comprising:
  a ninth step of rearranging the data in the second volume if data rearrangement in the second volume is executed;
  a tenth step of calculating:
    the data response performance in the second storage apparatus after executing the data rearrangement in the second volume, and
    comparing the calculated data response performance in the second storage apparatus with data response performance in the first storage apparatus; and
  an eleventh step of switching the transmission destination of the write data from the first virtual volume in the first storage apparatus to the second virtual volume in the second storage apparatus if the data response performance in the second storage apparatus is higher than the data response performance in the first storage apparatus.

6. The data rearrangement method according to claim 5, wherein the tenth step includes:
  sending a data response performance calculation request to the first storage apparatus after executing the data rearrangement in the second volume;
  calculating the data response performance in the first storage apparatus; and
  sending the data response performance in the first storage apparatus to the second storage apparatus.

* * * * *